(12) United States Patent
Yang et al.

(10) Patent No.: US 9,690,435 B2
(45) Date of Patent: Jun. 27, 2017

(54) TOUCH DISPLAY PANEL AND METHOD FOR MANUFACTURING AND DRIVING THE SAME AND TOUCH DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN); Yingming Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 42 days.

(21) Appl. No.: 14/769,383

(22) PCT Filed: Jan. 4, 2015

(86) PCT No.: PCT/CN2015/070027
§ 371 (c)(1),
(2) Date: Aug. 20, 2015

(87) PCT Pub. No.: WO2016/045240
PCT Pub. Date: Mar. 31, 2016

(65) Prior Publication Data
US 2016/0252999 A1  Sep. 1, 2016

(30) Foreign Application Priority Data

Sep. 28, 2014 (CN) .......................... 2014 1 0510357

(51) Int. Cl.
*G06F 3/044* (2006.01)
*G06F 3/046* (2006.01)
*G02F 1/1333* (2006.01)

(52) U.S. Cl.
CPC ............ *G06F 3/044* (2013.01); *G02F 1/1333* (2013.01); *G06F 3/046* (2013.01); *G06F 2203/04103* (2013.01); *G06F 2203/04106* (2013.01)

(58) Field of Classification Search
None
See application file for complete search history.

(56) References Cited

U.S. PATENT DOCUMENTS

2011/0291982 A1   12/2011   Hsieh et al.
2014/0078104 A1   3/2014    Lee et al.

FOREIGN PATENT DOCUMENTS

CN   101887334 A   11/2010
CN   102375612 A   3/2012
(Continued)

OTHER PUBLICATIONS

First Office Action regarding Chinese application No. 201410510357.4, dated Sep. 28, 2016. Translation provided by Dragon Intellectual Property Law Firm.
(Continued)

*Primary Examiner* — Kenneth B Lee, Jr.
(74) *Attorney, Agent, or Firm* — Harness, Dickey & Pierce, P.L.C.

(57) ABSTRACT

A touch display panel and a method for manufacturing and driving the same and a touch display device is provided by the present disclosure, where a first electromagnetic touch electrode is arranged at a side of the glass substrate away from the second substrate; an insulating layer is arranged on the first electromagnetic touch electrode; a second electro-
(Continued)

magnetic touch electrode and a capacitive touch electrode arranged in a same layer and insulated to each other is arranged on the insulating layer, where the second electromagnetic touch electrode and the first electromagnetic touch electrode are crossed and insulated to each other; a protection layer is arranged on the second electromagnetic touch electrode and the capacitive touch electrode; and a polarizer is arranged on the protection layer.

19 Claims, 4 Drawing Sheets

(56) References Cited

FOREIGN PATENT DOCUMENTS

| CN | 102955639 A | 3/2013 |
|----|-------------|--------|
| CN | 202976043 U | 6/2013 |
| CN | 103309094 A | 9/2013 |
| CN | 103913873 A | 7/2014 |
| CN | 103941946 A | 7/2014 |
| CN | 104252279 A | 12/2014 |
| CN | 204066082 U | 12/2014 |

OTHER PUBLICATIONS

Written Opinion of the International Searching Authority and International Search Report regarding international application No. PCT/CN2015/070027, filed Jan. 4, 2015.

TOUCH DISPLAY PANEL AND METHOD FOR MANUFACTURING AND DRIVING THE SAME AND TOUCH DISPLAY DEVICE

CROSS-REFERENCE TO RELATED APPLICATION

This application is the U.S. national phase of PCT Application No. PCT/CN2015/070027 filed on Jan. 4, 2015, which claims a priority to Chinese Patent Application No. 201410510357.4 filed on Sep. 28, 2014, the disclosures of which are incorporated in their entirety by reference herein.

TECHNICAL FIELD

The present disclosure relates to the field of display technology, in particular to a touch display panel with an electromagnetic touch function and a capacitive touch function, and a method for manufacturing and driving the same and a touch display device.

BACKGROUND

The electromagnetic touch technology can realize a handwriting function by using an original handwriting, therefore this technology has been widely applied to the fields such as the computer aided drawing (CAD) and drawing production since its emergence, and a plurality of display electronic products are provided with an electromagnetic touch panel, so as to input information.

However, the existing electromagnetic touch panel are generally provided with a back-attached electromagnetic antenna panel. Such electromagnetic antenna panel consisting of criss-cross metal lines is thick and not transparent, so it may only be attached to the back of a liquid crystal module (LCM).

Due to such back-attached structure, there exists a LCM between an electromagnetic touch stylus and the antenna panel in a touching process, so the strength of electromagnetic signal of the electromagnetic touch stylus needs to be enhanced to realize a smooth control, thereby increasing a power consumption of the electromagnetic touch stylus and reducing service life thereof.

In addition, the function of the existing electromagnetic touch product is too simple, where only the electromagnetic touch can be realized, and other types of touch mode are not compatible.

SUMMARY

A touch display panel and a method for manufacturing and driving the same and a touch display device is provided by the present disclosure, where the touch display panel is provided with an electromagnetic touch function and a capacitive touch function, so as to implement the electromagnetic touch and/or the capacitive touch, whereby the production cost and the working power consumption of the touch display panel may be reduced, and the touch display device may be slimed.

The technical schemes of the present disclosure are as follows:

A touch display panel is provided according to the present disclosure, including a first substrate and a second substrate, where the first substrate includes a glass substrate;

the touch display panel may further include:

a first electromagnetic touch electrode, arranged at a side of the glass substrate away from the second substrate;

an insulating layer, arranged on the first electromagnetic touch electrode;

a second electromagnetic touch electrode and a capacitive touch electrode arranged in a same layer and insulated to each other and arranged on the insulating layer, where the second electromagnetic touch electrode and the first electromagnetic touch electrode are crossed and insulated to each other;

a protection layer, arranged on the second electromagnetic touch electrode and the capacitive touch electrode; and a polarizer, arranged on the protection layer.

Optionally, the first electromagnetic touch electrode and the second electromagnetic touch electrode are bar-like electrodes.

Optionally, the first electromagnetic touch electrodes are parallel to each other, and the second electromagnetic touch electrodes are parallel to each other;

the first electromagnetic touch electrode and the second electromagnetic touch electrode are vertically crossed and insulated to each other.

Optionally, the capacitive touch electrode includes a plurality of capacitive touch electrode line groups arranged in a predetermined sequence, and a gap exists between different capacitive touch electrode line groups.

Optionally, the capacitive touch electrode line group is of a triangle pattern.

Optionally, the capacitive touch electrode determines, based on information of a capacitive touch electrode line group where a touch point is located and an intensity of a touch-induced capacitance therein, location information of the touch point.

Optionally, the plurality of capacitive touch electrode line groups of triangle pattern are opposite to each other in pairs, and a gap exists between a pair of capacitive touch electrode line groups opposite to each other.

Optionally, the capacitive touch electrode line group includes a plurality of capacitive touch electrode lines extending in a same direction;

the capacitive touch electrode lines of the capacitive touch electrode line group are electrically connected at the ends on a same side of the capacitive touch electrode lines.

Optionally, each capacitive touch electrode line group comprises a same number of the capacitive touch electrode lines.

Optionally, the second electromagnetic touch electrode and the capacitive touch electrode line are arranged by an interval.

Optionally, the second electromagnetic touch electrode between the capacitive touch electrode lines is arranged in a folding manner.

Optionally, the first substrate is a color filter substrate; the second substrate is an array substrate.

Optionally, a black matrix and a color filter layer are arranged at a side of the first substrate close to the second substrate.

Optionally, materials of the first electromagnetic touch electrode, the second electromagnetic touch electrode and the capacitive touch electrode include a transparent and conductive material.

A method for manufacturing a touch display panel is provided according to an embodiment of the present disclosure, where the touch display panel includes a first substrate and a second substrate, where the first substrate includes a glass substrate;

where the method includes:

forming a pattern of a first electromagnetic touch electrode at a side of the glass substrate away from the second substrate;

forming a pattern of an insulating layer on the first electromagnetic touch electrode;

forming, on the insulating layer, patterns of a second electromagnetic touch electrode and a capacitive touch electrode arranged in a same layer and insulated to each other, where the second electromagnetic touch electrode and the first electromagnetic touch electrode are crossed and insulated to each other;

forming a protection layer on the second electromagnetic touch electrode and the capacitive touch electrode; and forming a polarizer on the protection layer.

Optionally, materials of the first electromagnetic touch electrode, the second electromagnetic touch electrode and the capacitive touch electrode include a transparent and conductive material.

A method for driving a touch display panel is provided according to an embodiment of the present disclosure, to drive the touch display panel provided according to the above embodiments of the present disclosure;

where the method includes:

loading, in a touch detection phase, a corresponding driving signal to an electromagnetic touch electrode and a capacitive touch electrode arranged in a touch display panel synchronously, to implement simultaneously an electromagnetic touch detection and a capacitive touch detection on the touch display panel.

A method for driving a touch display panel is provided according to an embodiment of the present disclosure, to drive the touch display panel provided according to the above embodiments of the present disclosure;

where the method includes:

loading, in a touch detection phase, a corresponding driving signal to an electromagnetic touch electrode or a capacitive touch electrode arranged in a touch display panel, to implement an electromagnetic touch detection or a capacitive touch detection on the touch display panel in the touch detection phase.

A touch display device is provided according to an embodiment of the present disclosure, including the touch display panel provided according to the above embodiments of the present disclosure.

It can be seen from the above, according to the touch display panel and the method for manufacturing and driving the same and the touch display device provided according to the embodiments of the present disclosure, the first electromagnetic touch electrode is arranged at the side of the glass substrate of the first substrate of the touch display panel away from the second substrate; the insulating layer is arranged on the first electromagnetic touch electrode; the second electromagnetic touch electrode and the capacitive touch electrode arranged in a same layer and insulated to each other is arranged on the insulating layer, where the second electromagnetic touch electrode and the first electromagnetic touch electrode are crossed and insulated to each other; the protection layer is arranged on the second electromagnetic touch electrode and the capacitive touch electrode; and the polarizer is arranged on the protection layer, so as to provide the touch display panel with the electromagnetic touch function and the capacitive touch function, to implement the electromagnetic touch and/or the capacitive touch, whereby the production cost and the working power consumption of the touch display panel may be reduced, and the touch display device may be slimed.

DETAILED DESCRIPTION

To make clear the objective, technical schemes and advantages of the embodiment of the present disclosure, the technical schemes thereof will be described hereinafter in details in conjunction with the drawings thereof. Obviously, the described embodiments are merely a part of the embodiments of the present disclosure rather than all the embodiments. Based on the described embodiments of the present disclosure, all the other embodiments obtained by those skilled in the art may fall into the scope of the present disclosure.

Unless otherwise specified, the technical or scientific terms used herein should be the general meanings thereof which can be understood by those skilled in the art. In the specification and the claim of the disclosure, the expressions such as "first" and "second" is to differentiate the different components rather than to represent any sequence, amount or importance. Similarly, the expressions such as "one" or "a" means there exists at least one rather than a restriction to the amount. The expressions such as "connect" or "connected" is not restricted to a physically or a mechanical connection, where the connection may be an electric connection, regardless of whether the connection is direct or indirect. The expressions such as "on", "below", "left" and "right" are merely used to represent a relative location relationship, where the relative location relationship may change when an absolute location of the described object changes.

Figure 1:
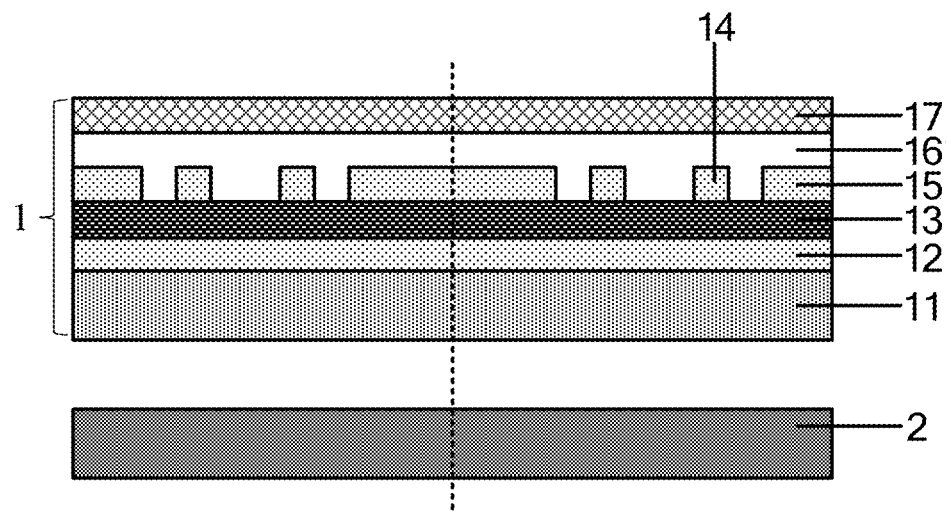
FIG. 1 is a schematic view showing a structure of a touch display panel provided according to an embodiment of the present disclosure.

A touch display panel is provided according to an embodiment of the present disclosure. As shown in FIG. 1, the touch display panel may include a first substrate 1 and a second substrate 2, where the first substrate 1 includes a glass substrate 11.

As shown in FIG. 1, the touch display panel may further include:

a first electromagnetic touch electrode 12, arranged at a side of the glass substrate 11 away from the second substrate 2;

an insulating layer 13, arranged on the first electromagnetic touch electrode 12;

a second electromagnetic touch electrode 14 and a capacitive touch electrode 15 arranged in a same layer and insulated to each other, and arranged on the insulating layer 13, where the second electromagnetic touch electrode 14 and the first electromagnetic touch electrode 12 are crossed and insulated to each other;

a protection layer 16, arranged on the second electromagnetic touch electrode 14 and the capacitive touch electrode 15; and a polarizer 17, arranged on the protection layer 16.

The touch display panel according to the embodiment of the present disclosure has an electromagnetic touch function and a capacitive touch function, whereby an original handwriting electromagnetic touch and a high-sensitivity capacitive touch can be integrated perfectly, the electromagnetic touch and/or the capacitive touch can be implemented, thereby improving a practicability and usability of the touch display panel and increasing the production competitiveness of the touch display device.

In addition, in the touch display panel provided according to the embodiment of the present disclosure, functional components implementing the electromagnetic touch and the capacitive touch are arranged at a side of the first substrate away from the second substrate, i.e., the touch display panel is manufactured by means of the On Cell process, and then a touch detection component may be preposed. By such structure arrangement, a thickness of the touch display panel may be reduced, the touch display device may be slimed, and the touch detection may be protected from an interference of a LCM (including the first substrate and the second substrate), a sensitivity and an accuracy of the touch detection may be improved, an electromagnetic signal strength of the electromagnetic touch component (e.g., electromagnetic touch stylus) may be reduced, thereby reducing a working power consumption of the touch display panel.

In the touch display panel according to the embodiment of the present disclosure, the second electromagnetic touch electrode 14 configured to implement the electromagnetic touch function and the capacitive touch electrode 15 configured to implement the capacitive touch function are arranged in a same layer and insulated to each other, therefore the patterns of the two electrodes may be formed simultaneously, and an additional mask exposing process is not required, thereby saving the production cost of the touch display panel. In addition, the touch display panel according to the embodiment of the present disclosure is of an On Cell structure, where a corresponding touch electrode pattern is formed on the glass substrate 11 of the first substrate 1. By means of such manufacturing process, the production cost of the touch display panel may be reduced significantly.

Figure 2:
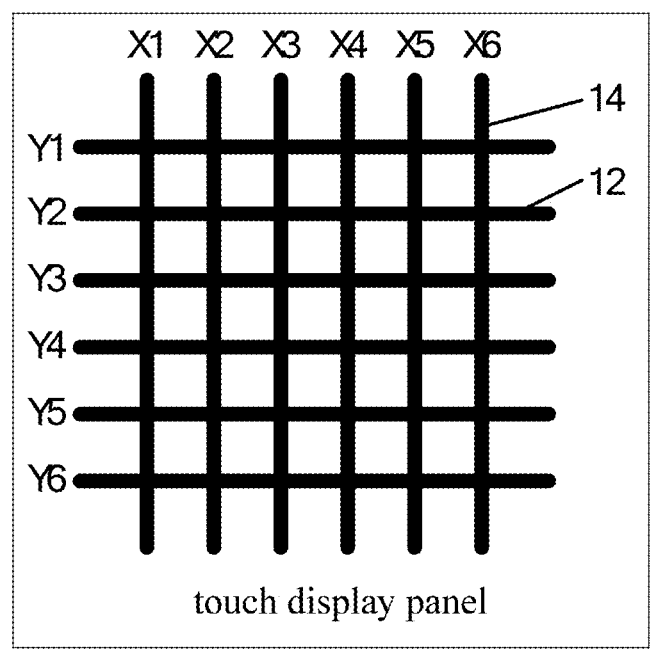
FIG. 2 is a schematic view showing a structure of a touch display panel provided according to another embodiment of the present disclosure.

As shown in FIG. 2, the first electromagnetic touch electrode 12 and the second electromagnetic touch electrode 14 in the embodiment of the disclosure may be bar-like electrodes, and the insulating layer 13 is arranged between the first electromagnetic touch electrode 12 and the second electromagnetic touch electrode 14 (as shown in FIG. 1), so as to avoid forming a short circuit between the first electromagnetic touch electrode 12 and the second electromagnetic touch electrode 14.

Figure 3:
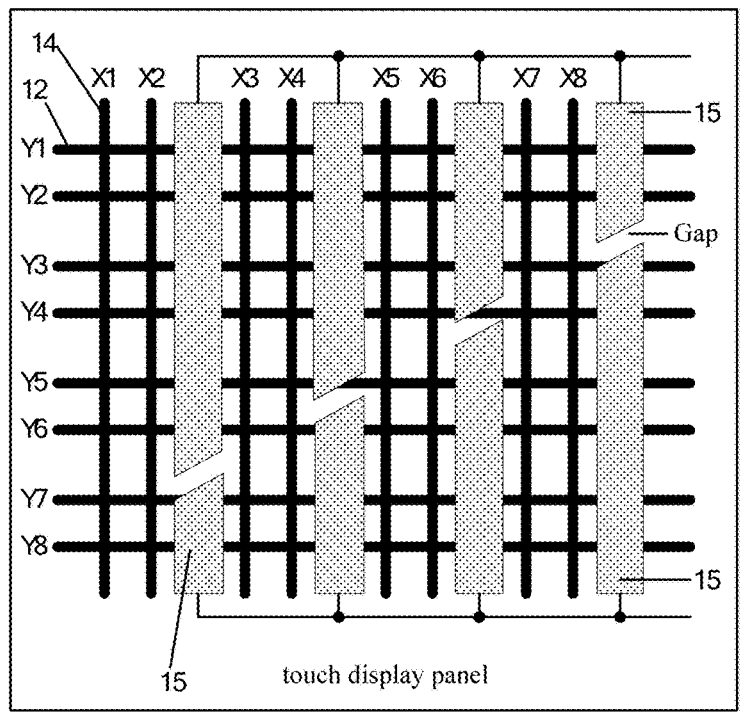
FIG. 3 is a schematic view showing a structure of a touch display panel provided according to yet another embodiment of the present disclosure.

In addition, as shown in FIG. 2 and FIG. 3, the crossed first electromagnetic touch electrode 12 and second electromagnetic touch electrode 14 may be vertically crossed. When an electromagnetic touch takes place, the first electromagnetic touch electrode 12 is configured to determine vertical-axis coordinate (i.e., Y-axis coordinate) information of a touch point, and second electromagnetic touch electrode 14 is configured to determine a horizontal-axis coordinate (i.e., X-axis coordinate) information of the touch point, so as to determine location information of the touch point where the electromagnetic touch takes place.

The electromagnetic touch in the embodiment of the present disclosure may be a process of touching, by a touch component such as electromagnetic touch stylus, an area where the LCM of the touch display panel is located. In that way, when the touch component such as electromagnetic touch stylus gets close to a surface of the area where the LCM of the touch display panel is located or touches the same and slides thereon, electromagnetic waves generated by the electromagnetic touch stylus may cut an electromagnetic field generated where the first electromagnetic touch electrode 12 and the second electromagnetic touch electrode 14 are crossed, and then an induced electromotive force is generated. The closer the location gets to the electromagnetic touch stylus, the more intense the induced electromotive force therein may be, thereby generating an induced current. After the induce current is processed via an amplifier circuit, a filter circuit, a sampling circuit, an analog-to-digital conversion circuit, etc. (these circuits are omitted in the above circuit drawings, existing reliable components may be adopted to implement the embodiment of the present disclosure), the processed induced current may be transmitted to a processor, i.e., a chip (omitted in the drawings), and then the coordinate (i.e., the location) information of the touch point where the electromagnetic touch takes place may be determined based on a calculation result of the processor.

Figure 4:
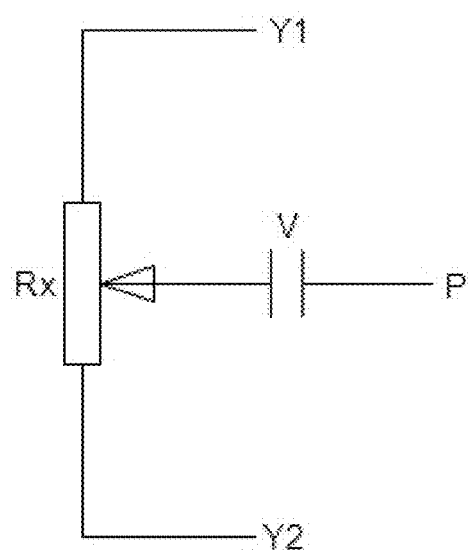
FIG. 4 is a schematic view showing a principle of implementing an electromagnetic touch on a touch display panel according to an embodiment of the present disclosure.

FIG. 4 is a schematic diagram showing a principle of the electromagnetic touch in the embodiment of the present disclosure. Supposing that both of the first electromagnetic touch electrodes Y1 and Y2 (only for illustration, there are a plurality of electrodes in practice) arranged in the vertical direction are crossed by a second electromagnetic touch electrode X1 arranged in the X-axis direction, equivalent to that a resistor Rx of a corresponding resistance is connected in series between the two nodes Y1 and Y2, an induced electromotive force V may be generated when the electromagnetic touch stylus slides between the first electromagnetic touch electrodes Y1 and Y2 (P shown in FIG. 4 represents the touch point of the electromagnetic touch stylus). The closer the location gets to the electromagnetic touch stylus, the more intense the induced electromotive force V therein may be. Magnitude of potential vectors received respectively by the two first electromagnetic touch electrodes Y1 and Y2 is presented by a location of a sliding resistor arrow along the resistor RX, whereby it may be determined which of the two first electromagnetic touch electrodes 12 receives a more intensive induced electromotive force V, and then a value of the induced current generated correspondingly may be larger. The first electromagnetic touch electrode 12 which generates correspondingly the largest value of induced current may be determined by the processor as a touch location in the Y-axis direction of the touch point of the electromagnetic touch stylus, whereby the Y-axis coordinate information of the touch point where the electromagnetic touch takes place may be determined.

Similarly, the second electromagnetic touch electrode 14 (i.e., the X-axis coordinate information of the touch point) corresponding to the touch point where the electromagnetic touch takes place may be determined, whereby the X-axis and Y-axis coordinates information of the touch point where the electromagnetic touch takes place may be determined, thereby determining the eventual coordinate location information of the touch point.

The touch display panel according to the embodiment of the present disclosure has an electromagnetic touch function and a capacitive touch function.

As shown in FIG. 3, the capacitive touch electrode 15 and the second electromagnetic touch electrode 14 are arranged in a same layer and insulated to each other, and the second electromagnetic touch electrode 14 and the first electromagnetic touch electrode 12 are crossed and insulated to each other.

Figure 5:
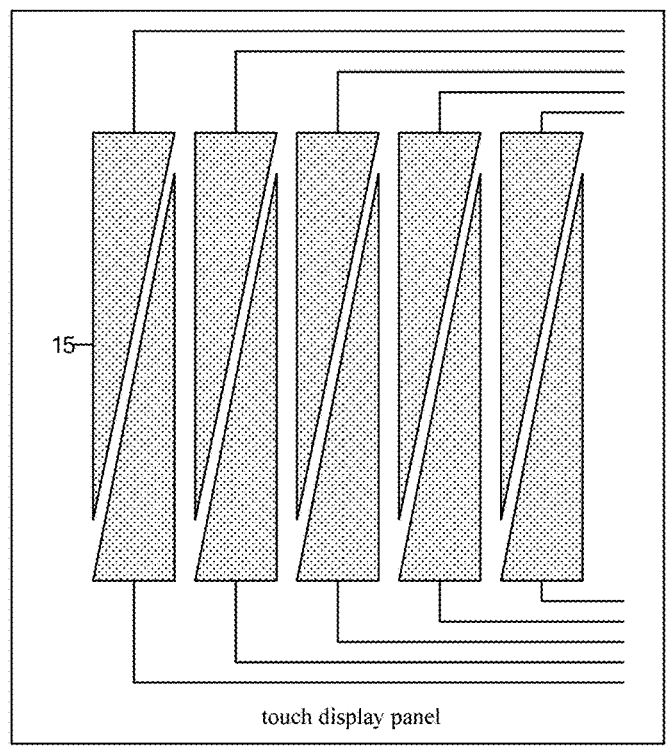
FIG. 5 is a schematic view showing a structure of an electrode of a touch display panel according to an embodiment of the present disclosure.

As shown in FIG. 5, the capacitive touch electrode 15 in the embodiment of the present disclosure includes a plurality of capacitive touch electrode line groups appearing generally as a triangle pattern and arranged in a predetermined sequence, such as a crossed opposition arrangement shown in FIG. 5. In addition, a Gap exists between different capacitive touch electrode line groups, i.e., the capacitive touch electrode line groups are insulated to each other.

The capacitive touch mode in the embodiment of the present disclosure may be a self capacitance touch mode. When a capacitive touch takes place, a capacitance of the capacitive touch electrode 15 where the touch point is located may vary accordingly, and the variation values of the capacitance in different locations of the capacitive touch electrode 15 may be different, whereby the location information of the touch point where the capacitive touch takes place may be determined. The plurality of capacitive touch electrode line groups of triangle pattern are opposite to each other in pairs, and a gap exists between a pair of capacitive touch electrode line groups opposite to each other.

In the embodiment of the present disclosure, any reliable method for determining the location of self capacitance touch may be adopted, to determine the location information of the touch point where the capacitive touch takes place.

In one embodiment of the present disclosure, the location of the touch point where the capacitive touch takes place may be determined based on information of the capacitive touch electrode line group where the touch point is located and an intensity of a touch-induced capacitance therein.

To be specific, when the capacitive touch takes place, the capacitive touch electrode 15 where the touch point is located may generate a corresponding value of capacitance variation, and then the coordinate information of the touch point in the capacitive touch electrode line group may be determined based on the value of the capacitance variation, and the location information of the capacitive touch electrode line group where the capacitive touch takes place may be determined based on the information of the capacitive touch electrode line group generating the value of the capacitance variation, whereby the location of the touch point where the capacitive touch takes place may be determined.

Figure 6:
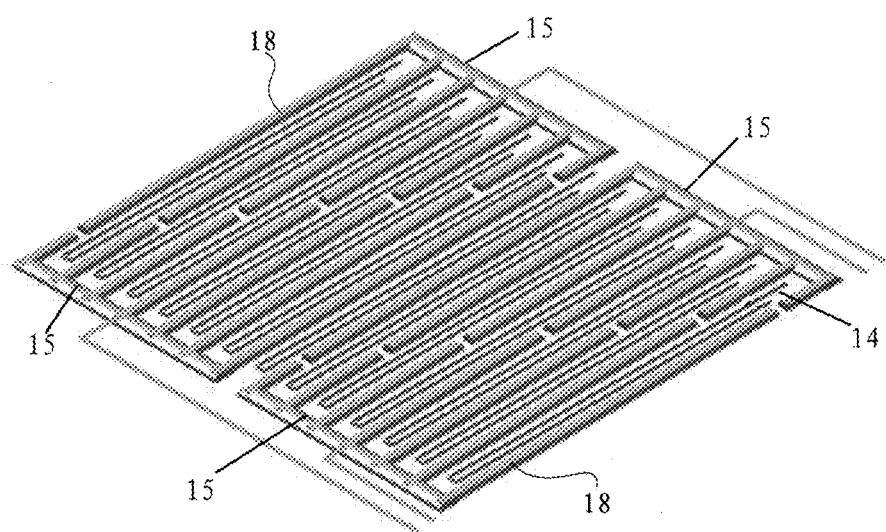
FIG. 6 is a schematic view showing a structure of an electrode of a touch display panel according to another embodiment of the present disclosure.
Figure 7:
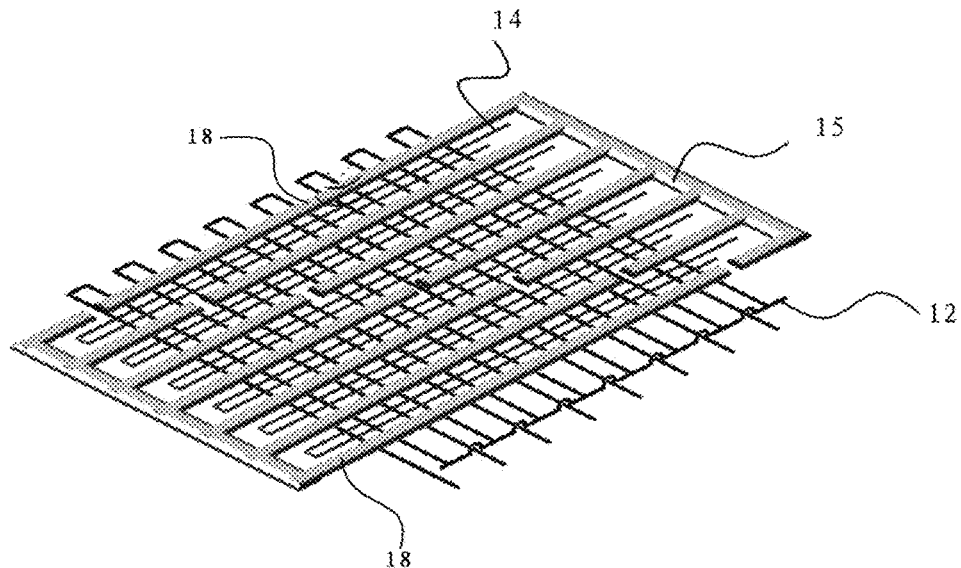
FIG. 7 is a schematic view showing a structure of an electrode of the touch display panel provided according to yet another embodiment of the present disclosure.

In the embodiment of the present disclosure, as shown in FIG. 6 and FIG. 7, the capacitive touch electrode line group in the embodiment of the disclosure includes a plurality of capacitive touch electrode lines 18 extending in a same direction. In addition, the capacitive touch electrode lines 18 of a same capacitive touch electrode line group are electrically connected at the ends on a same side of the capacitive touch electrode lines 18, and the capacitive touch electrode lines 18 of the same capacitive touch electrode line group are connected to a lead area of the first substrate 1 via a metal line arranged at an edge of a display area of the touch display panel.

To facilitate the manufacturing of the display panel and unify the standard of determining the location information of the capacitive touch, in the embodiment of the present disclosure, each capacitive touch electrode line group includes a same number of the capacitive touch electrode lines 18. Alternatively, the capacitive touch electrode line groups may include a different number of the capacitive touch electrode lines 18 in other embodiments.

In one embodiment of the present disclosure, as shown in FIG. 6 and FIG. 7, the second electromagnetic touch electrode 14 and the capacitive touch electrode line 18 in the embodiments of the disclosure may be arranged by an interval, so as to enlarge the area of detecting the electromagnetic touch and the capacitive touch.

In the embodiment of the present disclosure, as shown in FIG. 6 and FIG. 7, the second electromagnetic touch electrode 14 between the capacitive touch electrode lines 18 may be arranged in a folding manner, so as to realize a more accurate electromagnetic touch detection.

In the touch display panel according to the embodiment of the present invention, a touch detection component is preposed, i.e., the first electromagnetic touch electrode 12 and the second electromagnetic touch electrode 14 configured to implement the electromagnetic touch detection and the capacitive touch electrode 15 configured to implement the capacitive touch detection are arranged on an upper surface of the first substrate 1 where light is emitted from, therefore materials of the first electromagnetic touch electrode 12, the second electromagnetic touch electrode 14 and the capacitive touch electrode 15 in the embodiment of the present disclosure are transparent and conductive (such as ITO, Nano-Silver), so as to protect a normal display of the touch display panel from an interference of the above electrodes.

The first substrate 1 in the above embodiment of the present disclosure may be a color filter substrate, and the second substrate 2 therein may be an array substrate.

In that way, for the first substrate 1 serving as the color filter substrate, besides the above touch detection components arranged at the side of the first substrate 1 away from the second substrate 2, black matrix and color filter layer (omitted in the drawings) and so on required for the color filter substrate may be arranged at the side of the first substrate 1 close to the second substrate 2.

The second substrate 2 in the embodiment of the present disclosure (i.e., the array substrate) may include data line and gate line (omitted in the drawings) and so on required for the array substrate.

The touch display panel according to the embodiment of the present disclosure may load a corresponding driving signal to the electromagnetic touch electrodes (the first electromagnetic touch electrode 12 and the second electromagnetic touch electrode 14) and the capacitive touch electrode 15 synchronously, to implement simultaneously the electromagnetic touch and the capacitive touch on the touch display panel.

A method for driving a touch display panel is provided according to an embodiment of the present disclosure, where the method is to drive the touch display panel according to the above embodiments of the present disclosure.

The method includes:

loading, in a touch detection phase, a corresponding driving signal to an electromagnetic touch electrode and a capacitive touch electrode 15 arranged in a touch display panel synchronously, to implement simultaneously an electromagnetic touch detection and a capacitive touch detection on the touch display panel.

In addition, the touch display panel according to the embodiment of the present disclosure may load, in a touch detection phase, a corresponding driving signal to the electromagnetic touch electrode or the capacitive touch electrode 15, to implement the electromagnetic touch or the capacitive touch on the touch display panel.

A method for driving a touch display panel is provided according to an embodiment of the present disclosure, where the method is to drive the touch display panel provided according to the above embodiments of the present disclosure.

The method includes:

loading, in a touch detection phase, a corresponding driving signal to an electromagnetic touch electrode or a capacitive touch electrode 15 arranged in a touch display panel, to implement an electromagnetic touch detection or a capacitive touch detection on the touch display panel in the touch detection phase.

A method for manufacturing a touch display panel is provided according to an embodiment of the present disclosure, to manufacture the touch display panel provided according to the above embodiments of the present disclosure.

Figure 8:
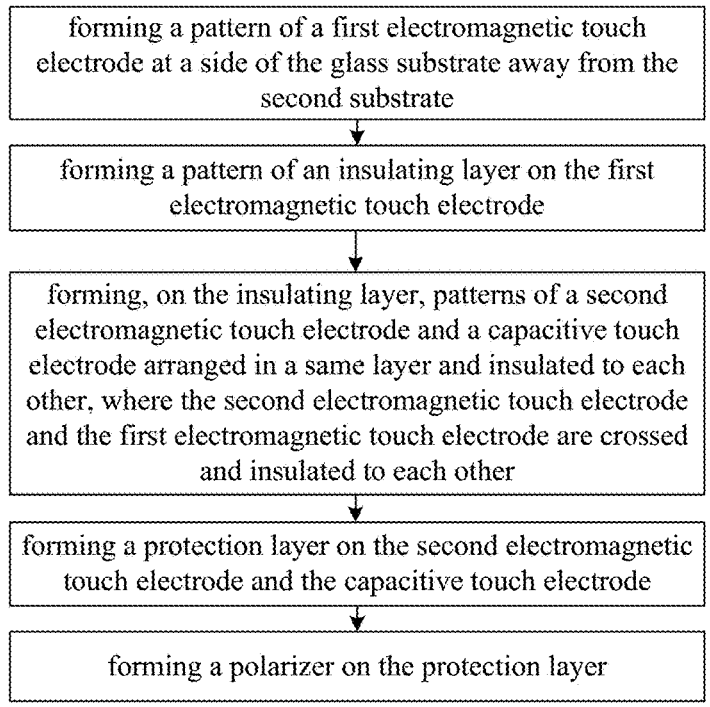
FIG. 8 is a schematic view showing a method for manufacturing a touch display panel according to an embodiment of the present disclosure.

As shown in FIG. 8, the method may include:

forming a pattern of a first electromagnetic touch electrode 12 at a side of a glass substrate 11 away from a second substrate 2;

forming a pattern of an insulating layer 13 on the first electromagnetic touch electrode 12;

forming, on the insulating layer 13, patterns of a second electromagnetic touch electrode 14 and a capacitive touch electrode 15 arranged in a same layer and insulated to each other, where the second electromagnetic touch electrode 14 and the first electromagnetic touch electrode 12 are crossed and insulated to each other;

forming a protection layer 16 on the second electromagnetic touch electrode 14 and the capacitive touch electrode 15; and forming a polarizer 17 on the protection layer 16.

The method for manufacturing a touch display panel provided according to the embodiment of the present disclosure is not restricted to the above process of forming the layers of pattern, and any reliable manufacturing process for forming the above layers of pattern is available in the embodiment of the present disclosure.

A touch display device is provided according to an embodiment of the present disclosure, where the touch display device includes the touch display panel according to the above embodiments of the present disclosure.

It can be seen from the above, according to the touch display panel and the method for manufacturing and driving the same and the touch display device provided according to the embodiments of the present disclosure, the first electromagnetic touch electrode is arranged at the side of the glass substrate of the first substrate away from the second substrate; the insulating layer is arranged on the first electromagnetic touch electrode; the second electromagnetic touch electrode and the capacitive touch electrode arranged in a same layer and insulated to each other is arranged on the insulating layer, where the second electromagnetic touch electrode and the first electromagnetic touch electrode are crossed and insulated to each other; the protection layer is arranged on the second electromagnetic touch electrode and the capacitive touch electrode; and the polarizer is arranged on the protection layer, so as to provide the touch display panel with the electromagnetic touch function and the capacitive touch function, to implement the electromagnetic touch and/or the capacitive touch, whereby the production cost and the working power consumption of the touch display panel may be reduced, and the touch display device may be slimed.

The above are merely the preferred embodiments of the present disclosure. It should be noted that, those skilled in the art may make further modifications and improvements to the present disclosure without departing from the principle of the present disclosure, and these modifications and improvements may also be considered as the scope of the present invention.

What is claimed is:

1. A touch display panel, comprising a first substrate and a second substrate, wherein the first substrate comprises a glass substrate, wherein the first substrate further comprises:

a first electromagnetic touch electrode, arranged at a side of the glass substrate away from the second substrate;

an insulating layer, arranged on the first electromagnetic touch electrode;

a second electromagnetic touch electrode and a capacitive touch electrode arranged in a same layer and insulated to each other, and arranged on the insulating layer, wherein the second electromagnetic touch electrode and the first electromagnetic touch electrode are crossed and insulated to each other;

a protection layer, arranged on the second electromagnetic touch electrode and the capacitive touch electrode; and a polarizer, arranged on the protection layer.

2. The touch display panel according to claim 1, wherein the first electromagnetic touch electrode and the second electromagnetic touch electrode are bar-like electrodes.

3. The touch display panel according to claim 1, wherein the first electromagnetic touch electrodes are parallel to each other, and the second electromagnetic touch electrodes are parallel to each other;

the first electromagnetic touch electrode and the second electromagnetic touch electrode are vertically crossed and insulated to each other.

4. The touch display panel according to claim 1, wherein the capacitive touch electrode comprises a plurality of capacitive touch electrode line groups arranged in a predetermined sequence, and a gap exists between different capacitive touch electrode line groups.

5. The touch display panel according to claim 4, wherein the capacitive touch electrode line group is of a triangle pattern.

6. The touch display panel according to claim 4, wherein the capacitive touch electrode determines, based on information of a capacitive touch electrode line group where a touch point is located and an intensity of a touch-induced capacitance therein, location information of the touch point.

7. The touch display panel according to claim 5, wherein the plurality of capacitive touch electrode line groups of triangle pattern are opposite to each other in pairs, and a gap exists between a pair of capacitive touch electrode line groups opposite to each other.

8. The touch display panel according to claim 4, wherein the capacitive touch electrode line group comprises a plurality of capacitive touch electrode lines extending in a same direction;

the capacitive touch electrode lines of the capacitive touch electrode line group are electrically connected at the ends on a same side of the capacitive touch electrode lines.

9. The touch display panel according to claim 8, wherein each capacitive touch electrode line group comprises a same number of the capacitive touch electrode lines.

10. The touch display panel according to claim 8, wherein the second electromagnetic touch electrode and the capacitive touch electrode line are arranged by an interval.

11. The touch display panel according to claim 10, wherein the second electromagnetic touch electrode between the capacitive touch electrode lines is arranged in a folding manner.

12. The touch display panel according to claim 1, wherein the first substrate is a color filter substrate;
the second substrate is an array substrate.

13. The touch display panel according to claim 12, wherein a black matrix and a color filter layer are arranged at a side of the first substrate close to the second substrate.

14. The touch display panel according to claim 1, wherein materials of the first electromagnetic touch electrode, the second electromagnetic touch electrode and the capacitive touch electrode comprise a transparent and conductive material.

15. A method for manufacturing a touch display panel, wherein the touch display panel comprises a first substrate and a second substrate, wherein the first substrate comprises a glass substrate;
wherein the method comprises:
forming a pattern of a first electromagnetic touch electrode at a side of the glass substrate away from the second substrate;
forming a pattern of an insulating layer on the first electromagnetic touch electrode;
forming, on the insulating layer, patterns of a second electromagnetic touch electrode and a capacitive touch electrode arranged in a same layer and insulated to each other, wherein the second electromagnetic touch electrode and the first electromagnetic touch electrode are crossed and insulated to each other;
forming a protection layer on the second electromagnetic touch electrode and the capacitive touch electrode; and
forming a polarizer on the protection layer.

16. The method according to claim 15, wherein materials of the first electromagnetic touch electrode, the second electromagnetic touch electrode and the capacitive touch electrode comprise a transparent and conductive material.

17. A method for driving the touch display panel according to claim 1;
wherein the method comprises:
loading, in a touch detection phase, a corresponding driving signal to an electromagnetic touch electrode and a capacitive touch electrode arranged in a touch display panel synchronously, to implement simultaneously an electromagnetic touch detection and a capacitive touch detection on the touch display panel.

18. A method for driving the touch display panel according to claim 1;
wherein the method comprises:
loading, in a touch detection phase, a corresponding driving signal to an electromagnetic touch electrode or a capacitive touch electrode arranged in a touch display panel, to implement an electromagnetic touch detection or a capacitive touch detection on the touch display panel in the touch detection phase.

19. A touch display device, comprising the touch display panel according to claim 1.

* * * * *